United States Patent [19]

Hutchison et al.

[11] Patent Number: 4,463,046

[45] Date of Patent: Jul. 31, 1984

[54] SYNTHETIC RESIN PANELS JOINED BY AN INTEGRAL HINGE HAVING DUAL DUROMETER PLIES

[75] Inventors: Herbert L. Hutchison, Whitehall; Byron W. Rose, Williamsport, both of Ohio

[73] Assignee: Crane Plastics, Inc., Columbus, Ohio

[21] Appl. No.: 540,336

[22] Filed: Oct. 11, 1983

[51] Int. Cl.³ ............................................... B32B 3/02
[52] U.S. Cl. .................................... 428/156; 428/126; 428/167; 428/192; 428/217
[58] Field of Search ................................ 428/121–130, 428/167, 192, 217, 156, 218

[56] References Cited

U.S. PATENT DOCUMENTS

| | | | |
|---|---|---|---|
| 3,634,182 | 1/1972 | Biglin et al. | 428/192 |
| 4,157,413 | 6/1979 | Ruhl | 428/218 |
| 4,209,043 | 6/1980 | Menzel | 428/121 |
| 4,391,303 | 7/1983 | Holgersson | 428/167 |

FOREIGN PATENT DOCUMENTS 52-74662  6/1977  Japan .................................... 428/194

Primary Examiner—William J. Van Balen
Attorney, Agent, or Firm—William S. Rambo; William Cates Rambo

[57] ABSTRACT

A dual-durometer integral synthetic resin hinge joins two relatively rigid synthetic resin sections. The hinge comprises a first ply of the same composition and hardness as the rigid panels and an overlying second ply of relatively softer synthetic resin material. The first ply of the hinge is scored to provide a fracture line adjacent the hinge axis.

3 Claims, 4 Drawing Figures

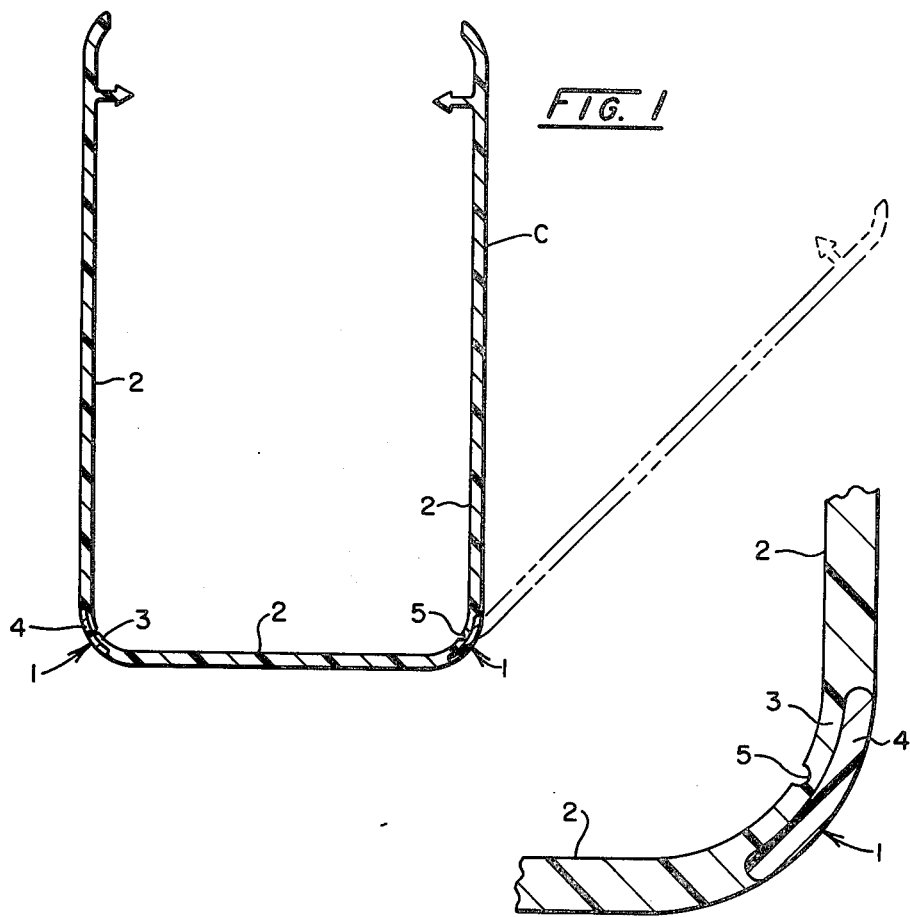
FIG. 1
FIG. 2
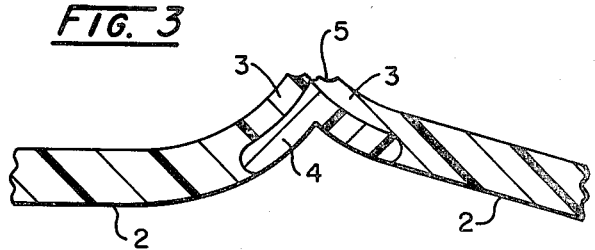
FIG. 3
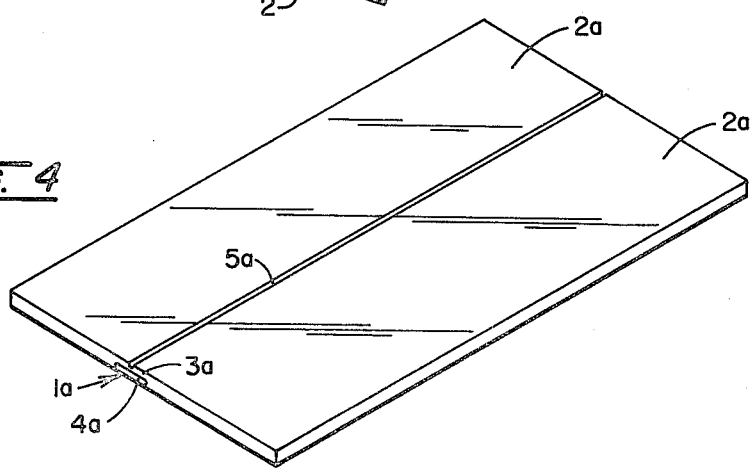
FIG. 4

SYNTHETIC RESIN PANELS JOINED BY AN INTEGRAL HINGE HAVING DUAL DUROMETER PLIES

BACKGROUND OF THE INVENTION

This invention relates to the technical field of integral hinges joining synthetic resin panels. More particularly, this invention relates to integral hinges having two plies of synthetic resin, namely—a relatively rigid, high durometer, first ply and a relatively flexible, low durometer, second ply, and wherein the first ply has the same hardness and composition as the adjoining synthetic resin panels and the second ply overlies the first ply and is composed of a synthetic resin material having a hardness substantially less than first ply.

It is necessary in many applications for plastic or synthetic resin articles to have inherent flexibility in certain localized areas, without introducing irreversible distortion or fracture of the plastic during flexing. More specifically, many applications require portions of the synthetic resin article to be substantially rigid to provide structural integrity during its intended use. However, for ease of installation certain portions of the article should be relatively flexible, but not so soft as to affect the overall utility of the article for its intended use. Thus, the need arises for synthetic resin articles having a relatively flexible semi-rigid area connecting substantially more rigid areas, approximately analogus to a hinge. Such hinges in synthetic resin articles are used in numerous applications. We enumerate a few illustrative examples to clarify, in a practical sense, the utility of such synthetic resin hinges.

Folding doors are often constructed of numerous rigid plastic panels joined by relatively flexible plastic hinges. The plastic joining material must be sufficiently flexible to permit the individual door panels to fold or collapse to nearly a face-to-face parallel geometry when the folding door is fully open (contracted). Yet the same flexible plastic joining material must be sufficiently durable to withstand many flexing operations, and form an integral part of the door itself when the door is fully closed (extended). Thus, the plastic joining material must have a correct balance flexibility, without being too soft to function as an integral part of the closed door.

A major use for semi-rigid plastics is for construction applications. For example, in open office systems, a semi-rigid plastic is a very convenient way to join space separation panels at a variety of angles for a variety of office configurations, without incurring unacceptable expense in assembly and disassembly.

A further application to construction involves hinges on access panels to enable easy access to office equipment, electrical cabinets, etc. Fexibility is clearly called for as a hinge on an access panel, but certain rigidity and structural integrity is also desirable.

As a final illustrative example, for raceway covers as used in open office systems it is desirable to have rigidity and durability to function as covers, but also a certain flexibility. Rigidity is required of the panels to maintain a structurally sound covering, while some flexibility at the corners is desired for rapid installation in a variety of geometries.

These examples illustrate a few of the cases in which hinge areas in plastic objects are desirable. One common method for constructing such hinges is to coextrude the rigid plastic material in conjunction with a softer, more flexible material, arranging the extrusion geometry such that the softer material is extruded into, and forms a part of the area, where the final product is required to flex. Although such dual-durometer hinges provide a single, integral structure incorporating the hinge, the use of two different durometer plastics makes production to close tolerances difficult. The softer, more flexible material tends to distort relative to the harder material during extrusion and later cooling. Therefore, it is one of the primary purposes of the present invention to produce a dual-durometer integral synthetic resin hinge readily coextruded with a uniform profile.

SUMMARY OF THE INVENTION

The present invention comprises an integral synthetic resin body composed of at least two substantially rigid sections of predetermined hardness connected in adjoining relation by a plural layer, flexible hinge section. Said hinge section comprises a first ply of relatively rigid synthetic resin of the same hardness and composition, but of lesser thickness than said rigid sections, and an overlying second ply of relatively softer, more flexible material. The first ply having the same composition as the rigid section, provides initial rigidity for the hinge. Upon irreversible fracture of said first ply, the second, more flexible ply, continues to join the panels. This structure provides a dual-durometer synthetic resin hinge with improved profile stability and improved coextrusion properties.

It is a primary object of the present invention to provide an improved integral synthetic resin hinge joining substantially rigid sections.

It is a further object of the present invention to provide an integral, dual-durometer synthetic resin hinge with improved profile stability during coextrusion.

It is yet another object of the present invention to provide an integral synthetic resin hinge that will remain relatively rigid until distortion beyond a critical angle occurs, at which point the hinge becomes irreversibly flexible, while maintaining profile integrity in both rigid and flexible modes.

BRIEF DESCRIPTION OF DRAWINGS

FIG. 1 is a transverse, vertical cross sectional view taken through a raceway cover according to this invention and showing by broken lines an outwardly flexed position for one of the sidewalls of the cover;

FIG. 2 is an enlarged, fragmentary vertical sectional view taken through one of the hinges of the raceway cover;

FIG. 3 is a similar view showing the rigid ply of the hinge in broken or fractured condition; and FIG. 4 is a small scale perspective view of a modified embodiment of the invention which comprises a pair of substantially rigid coplanar panels joined by a dual-durometer hinge.

DESCRIPTION OF PREFERRED EMBODIMENTS OF THE INVENTION

FIG. 1 illustrates, in cross section, a generally U-shaped, extruded synthetic resin base or raceway cover C for attachment to a movable office partition wall, not shown. The cover C includes three, substantially rigid panel sections 2 joined by integral, dual-durometer hinges 1. FIG. 2 shows one of the integral hinges in enlarged section. Each of the hinges 1 comprises a relatively thin ply or web 3 of synthetic resin of the same hardness and composition as the panels 2. Overlying the thin ply 3 is a second, flexible ply 4 of synthetic resin having a hardness substantially less than that of panels 2 and hinge ply 3. In the preferred embodiment, a continuous longitudinal groove or score line 5 is formed in the surface of ply 3 opposite the flexible hinge ply 4. Groove 5 partially defines and lies adjacent to the axis of rotation of the integral hinge 1.

The plural ply, composite structure shown in FIGS. 1 and 2, permits the hinge to resiliently flex to a limited extent about an axis defined by groove 5. Although ply 3 has the same composition and hardness as panels 2, it is thinner and will bend or flex at its thinnest part, namely in the region of groove 5. The resilient flexure of one of the hinges is illustrated by broken lines in FIG. 1. However, if and when the modulus of elasticity of the thinned area of the ply 3 is exceeded, the ply 3 will break or fracture along the groove 3. Even though irreversible fracture of the relatively rigid hinge ply 3 has occured, the softer, more flexible ply 4 remains intact to provide a dead flexible hinge between the adjoining panels 2.

Depending upon the thickness and hardness of the hinge ply 3, it may be made to frature by flexing it through an angle as small as 30 degrees, or as large as 120 degrees. Thus, the present invention provides a dual-durometer, plural ply, integral hinge capable of either limited resilient flexibility, or substantially unlimited dead flexibility.

The rigid panels 2 and rigid hinge ply 3 are usually formed from, or composed of, the same thermoplastic synthetic resin and thus have the same hardness characteristics. The flexible hinge ply 1 may be composed of the same thermoplastic resin as used to form the rigid panels 2 and hinge ply 3, but the stream or column of resin which forms the flexible hinge ply 4 contains a comparatively larger amount of plasticizer to thus provide a softer, more flexible quality for the ply 4. Alternatively, the flexible hinge ply 4 may be composed of a thermoplastic synthetic resin of different chemical composition from that used to form the rigid panels 2 and the rigid hinge ply 3. In other words, the finished product may result from a coextrusion of two different synthetic resins having differing hardness characteristics, or from a coextrusion of two streams or columns of the same thermoplastic synthetic resin, but wherein one stream is more highly plasticized than the other. For example, the entire finished piece including the panels 2 and hinge plies 3 and 4 may be composed of polyvinyl chloride (PVC), but the stream or column of resin which forms the flexible hinge ply 4 will be more highly plasticized than the stream or column of resin which forms the panels 2 and rigid hinge ply 3. Alternatively, the flexible hinge ply or overlay 4 may be composed of chemically different, relatively softer and more flexible resin than that used to form the panels 2 and rigid hinge ply 3. For example, a given piece or profile may be formed from a coextrusion in which the panels 2 and rigid hinge ply 3 are composed of a polycarbonate resin and the flexible hinge ply 4 is composed of an elastomeric polyolefin, such as polypropylene. When two different species of resins are used in a dual coextrusion, care must be taken to select resins which are adhesively compatible to insure a truly integral, one-piece finished product.

Resins which maybe selected to form the more rigid sections of the coextrusion include, but are not necessary limited to: acrylics, acetals, styrene, polyvinyl chloride, chlorinated polyvinyl choride, polyesters, polysulfones, polyphenylene oxides, polycarbonates, rubber-modified acrylonitrile, vinyl acetate copolymers and styrene terpolymers. Resins which may be used to form the more flexible and softer overlay or hinge ply 4 of the coextrusion include, but are not necessarily limited to: polyolefins, polyvinyl chloride, vinyl acetate, ionomers, polyurethanes, cured or cross-linked elastomers and other thermoplastic elastomers.

Regardless of the particular species of resins used, the more rigid sections of the coextrusions should have a hardness of at least Shore durometer 75D and preferabley higher, whereas, the softer, more flexible hinge ply or overlay 4 should range between Shore durometer 50A through 93C.

FIG. 4 shows a modified structure which may be used as a folding partition wall or screen, and which comprises a pair of substantially rigid panel sections 2a joined in normally coplanar relation by a composite, plural ply hinge section 1a according to this invention. A score line or groove 5a is formed in the rigid hinge ply 3a on the surface thereof opposite the softer, more flexible hinge ply or overlay 4a. The partition wall or screen may be extruded in a flat, planar profile, as shown, but in use may be adjusted to place the panel sections 2a in variable angular relationship.

In view of the foregoing, it will be seen that the present invention provides an integral panel and hinge construction which may be readily fabricated as a coextrusion of one or more species of synthetic resin utilizing conventional extrusion apparatus and technics. Panel and hinge pieces according to this invention are characterized by improved dimensional tolerance and stability and their versatility in providing either a resiliently flexible hinge, or a dead, freely flexible hinge.

While preferred embodiments of the invention have been illustrated and described in detail, it will be understood that various modifications in details of construction and design may be made without departing from the spirit of the invention or the scope of the following claims.

We claim:

1. An integral synthetic resin body comprising at least two substantially rigid sections of predetermined hardness connected in adjoining relation by a hinge section, the hinge section of said body including a first ply of lesser thickness than said rigid sections but having the same hardness and composition as said rigid sections, and a second ply overlying and integrally formed with the first ply of said hinge section, but having a hardness substantially less than said rigid sections and the first ply of said hinge section.

2. A synthetic resin body according to claim 1, wherein the surface of said first ply opposite said second ply is formed with a longitudinal groove defining a weakened, fracture line in said first ply.

3. A synthetic resin body according to claim 1, wherein said hinge section comprises a first ply having a Shore hardness of at least 75D, and said second ply has a Shore hardness between 50A and 93C.

* * * * *